United States Patent
Lee et al.

(10) Patent No.: US 11,496,891 B2
(45) Date of Patent: Nov. 8, 2022

(54) IDENTITY PRIVACY IN WIRELESS NETWORKS

(71) Applicant: QUALCOMM Incorporated, San Diego, CA (US)

(72) Inventors: Soo Bum Lee, San Diego, CA (US); Anand Palanigounder, San Diego, CA (US); Adrian Edward Escott, Reading (GB); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 605 days.

(21) Appl. No.: 16/287,308

(22) Filed: Feb. 27, 2019

(65) Prior Publication Data

US 2019/0394640 A1 Dec. 26, 2019

Related U.S. Application Data

(63) Continuation of application No. 14/808,862, filed on Jul. 24, 2015, now Pat. No. 10,237,729.

(Continued)

(51) Int. Cl.
*H04W 12/02* (2009.01)
*H04W 8/04* (2009.01)
(Continued)

(52) U.S. Cl.
CPC ............ *H04W 12/02* (2013.01); *H04W 8/04* (2013.01); *H04W 8/183* (2013.01);
(Continued)

(58) Field of Classification Search
CPC ..... H04W 12/02; H04W 12/033; H04W 8/04; H04W 8/183; H04W 12/72; H04W 12/04;
(Continued)

(56) References Cited

U.S. PATENT DOCUMENTS

| 6,373,949 | B1 | 4/2002 | Aura |
| 2003/0027581 | A1 | 2/2003 | Jokinen et al. |

(Continued)

FOREIGN PATENT DOCUMENTS

| CN | 101511082 A | 8/2009 |
| CN | 101720086 A | 6/2010 |

(Continued)

OTHER PUBLICATIONS

3GPP TS 33.203: 3rd Generation Partnership Project, Technical Specification Group Services and System Aspects, 3G Security, Access Security for IP-based Services (Release 12), 3GPP Standards, 3rd Generation Partnership Project (3GPP), Mobile Competence Centre, 650, Route Des Lucioles, F-06921 Sophia-Antipolis Cedex, France, vol. SA WG3, No. V12.8.0, Dec. 19, 2014 (Dec. 19, 2014), pp. 1-140, XP050927291, [retrieved on Dec. 19, 2014] Definitions, p. 68-p. 71, figure N.1 p. 95-p. 96 p. 13 p. 19-p. 22, figure 4 p. 38.

(Continued)

*Primary Examiner* — Kevin Bechtel
*Assistant Examiner* — Forrest L Carey
(74) *Attorney, Agent, or Firm* — Haynes and Boone, LLP

(57) ABSTRACT

Systems and techniques are disclosed to protect a user equipment's international mobile subscriber identity by providing a privacy mobile subscriber identity instead. In an attach attempt to a serving network, the UE provides the PMSI instead of IMSI, protecting the IMSI from exposure. The PMSI is determined between a home network server and the UE so that intermediate node elements in the serving network do not have knowledge of the relationship between the PMSI and the IMSI. Upon receipt of the PMSI in the attach request, the server generates a next PMSI to be used in a subsequent attach request and sends the next PMSI to the UE for confirmation. The UE confirms the next PMSI to (Continued)

synchronize between the UE and server and sends an acknowledgment token to the server. The UE and the server then each update local copies of the current and next PMSI values.

22 Claims, 8 Drawing Sheets

Related U.S. Application Data

(60) Provisional application No. 62/128,724, filed on Mar. 5, 2015.

(51) Int. Cl.
*H04W 8/18* (2009.01)
*H04W 12/033* (2021.01)
*H04W 12/72* (2021.01)
*H04L 101/654* (2022.01)
*H04W 12/04* (2021.01)
*H04W 12/06* (2021.01)

(52) U.S. Cl.
CPC ..... *H04W 12/033* (2021.01); *H04L 2101/654* (2022.05); *H04W 12/04* (2013.01); *H04W 12/06* (2013.01); *H04W 12/72* (2021.01)

(58) Field of Classification Search
CPC ............... H04W 12/06; H04L 61/6054; H04L 2101/654
See application file for complete search history.

(56) References Cited

U.S. PATENT DOCUMENTS

| | | |
|---|---|---|
| 2003/0229787 A1 | 12/2003 | Gabor |
| 2006/0154646 A1 | 7/2006 | Tung |
| 2006/0171536 A1 | 8/2006 | Lim |
| 2007/0297367 A1 | 12/2007 | Wang et al. |
| 2009/0002484 A1 | 1/2009 | Karman et al. |
| 2009/0024848 A1 | 1/2009 | Takasugi et al. |
| 2009/0163211 A1* | 6/2009 | Kitazoe ............... H04W 74/004 455/436 |
| 2010/0159924 A1 | 6/2010 | Lagerman et al. |
| 2011/0136482 A1 | 6/2011 | Kaliner |
| 2012/0322410 A1* | 12/2012 | Lodeweyckx ........ H04W 12/06 455/411 |
| 2013/0324082 A1 | 12/2013 | Mohajeri |
| 2013/0326224 A1 | 12/2013 | Yavuz |
| 2016/0262015 A1 | 9/2016 | Lee et al. |
| 2017/0070880 A1 | 3/2017 | Hahn et al. |

FOREIGN PATENT DOCUMENTS

| | | |
|---|---|---|
| CN | 101959183 A | 1/2011 |
| CN | 101969638 A | 2/2011 |
| CN | 101998377 A | 3/2011 |
| CN | 102905265 A | 1/2013 |
| JP | 2009094940 A | 4/2009 |
| WO | 2008005162 A2 | 1/2008 |
| WO | 2011036484 A2 | 3/2011 |
| WO | 2013140684 A1 | 9/2013 |
| WO | 2014020237 A1 | 2/2014 |

OTHER PUBLICATIONS

3GPP TS 43.020: "3rd Generation Partnership Project, Technical Specification Group Services and System Aspects, Security Related Network Functions (Release 12)", 3GPP Standard, 3rd Generation Partnership Project (3GPP), Mobile Competence Centre, 650, Route Des Lucioles, F-06921 Sophia-Antipolis Cedex, France, vol. SA WG3, No. V12.1.0, Jun. 26, 2014 (Jun. 26, 2014). pp. 1-111, XP050774372, [retrieved on Jun. 26, 2014] p. 11-p. 18, figure 2.1.
Choudhury., et al., "Enhancing User Identity Privacy in LTE", 2012, IEEE 11th Internation Conference on Trust, Security and Privacy in Computing and Communications, pp. 949-957.
International Search Report and Written Opinion—PCT/US2016/018860—ISA/EPO—dated Jun. 9, 2016.
Koien G.M., "Privacy Enhanced Mutual Authentication in LTE," 2013 IEEE 9th International Conference on Wireless and Mobile Computing, Networking and Communications (WiMob), 2013, pp. 614-621.
LTE Security: "Third-Generation Security (UMTS)", Oct. 17, 2012 (Oct. 17, 2012), pp. 37-65, XP055273721, ISBN: 978-1-118-35558-9 Retrieved from the Internet: URL: http://eu.wiley.com/WileyCDA/WileyTitle/productCd-111835558X.html [retrieved on May 19, 2016] p. 48.
Second Written Opinion from International Application No. PCT/US2016/018860, dated Nov. 29, 2016, 8 pp.
European Search Report—EP21159167—Search Authority—Munich—dated Apr. 6, 2021.
Forsberg D., et al., "LTE Security: Second Edition", Publication data: LTE Security, Nov. 30, 2012, Wiley, Chichester, 5 Pages.
Korkusuz A.Y., "Security in the GSM Network", Bogazici University, Electrical-Electronics Engineering Department, EE 588—Network Security, 2012, Viewed on Jan. 21, 2021, 34 Pages, https://web.itu.edu.tr/~korkusuza/Security%20in%20the%20GSM%20Network.pdf?kategori=php.
Taiwan Search Report—TW105106158—TIPO—dated Jun. 18, 2019.
Taiwan Search Report—TW108125658—TIPO—dated Aug. 6, 2020.

\* cited by examiner

IDENTITY PRIVACY IN WIRELESS NETWORKS

CROSS-REFERENCE TO RELATED APPLICATIONS

The present application is a continuation of U.S. Non-Provisional patent application Ser. No. 14/808,862 filed Jul. 24, 2015, which claims the benefit of U.S. Provisional Patent Application No. 62/128,724, filed Mar. 5, 2015, and entitled "Identity Privacy in Wireless Networks," the disclosures of which are incorporated by reference herein in its entirety.

TECHNICAL FIELD

This application relates to wireless communication systems, and more particularly to increasing the privacy of subscriber identities during wireless communication.

BACKGROUND

To receive services from a network, an unknown user equipment (UE) needs to register with the network or otherwise become known to the network. This is accomplished using a network attach procedure. As part of the attach procedure, the UE sends its international mobile subscriber identity (IMSI) number. The IMSI is a unique identification that the UE uses on all networks it communicates with (or which communicate on its behalf). The UE sends the IMSI with the attach request that is received at a mobility management entity (MME).

In an attempt to protect the IMSI from eavesdroppers and tracking, a temporary mobile subscriber identity (TMSI) can be used after initially authenticating the UE. The TMSI is local to a specific area and, therefore, must be reassigned in each area. Further, the TMSI is first assigned after the UE provides the IMSI for initial authentication (and so that the assignment of the TMSI can be associated with the UE's real identity). Sometimes a globally unique temporary UE identity (GUTI) is provided in the initial attach request instead of IMSI. Where the UE sends a GUTI instead its IMSI, the MME requests identification from other network elements that may have interacted with the UE previously. If the UE is known to other network elements, those other network elements respond with the IMSI. If the UE is not known, the MME then asks the UE to provide its IMSI for identification that is later used for update procedures with a location register.

Under any of the approaches above, the IMSI is still vulnerable. The IMSI is either included in the initial attach request or must be provided later in order to be authenticated. Thus, the IMSI may be monitored passively via the over-the-air traffic and used to determine a user identity. Oftentimes the IMSI in the attach request is in plaintext, rendering the IMSI even more vulnerable to monitoring. Even in scenarios where the UE does not send the IMSI, the MME still obtains the actual IMSI from other network elements, and several different network elements may store the actual IMSI (e.g., the MME, a serving gateway (S-GW), and/or a PDN gateway (P-GW)). This leaves the IMSI vulnerable and dependent on the trustworthiness of the serving network.

SUMMARY

In one aspect of the disclosure, a method for network access by a user equipment (UE) includes sending, from the UE, a privacy mobile subscriber identity (PMSI) in place of an international mobile subscriber identity (IMSI) to identify the UE with an initial attach message to a server on a network, receiving, from the server, an authentication request that includes a next PMSI, the next PMSI being a different value derived from the PMSI, and sending, from the UE, an acknowledgment of receipt of the next PMSI to the server.

In an additional aspect of the disclosure, a user equipment includes a memory configured to store a privacy mobile subscriber identity (PMSI), a transceiver configured to send the PMSI in place of an international mobile subscriber identity (IMSI) to identify the UE with an initial attach message to a server on a network and receive, from the server, an authentication request that includes a next PMSI, the next PMSI being a different value derived from the PMSI, and a processor configured to generate an acknowledgment of receipt, wherein the transceiver is further configured send the acknowledgement of receipt to the server.

In an additional aspect of the disclosure, computer-readable medium having program code recorded thereon includes code for causing a user equipment (UE) to send a privacy mobile subscriber identity (PMSI) in place of an international mobile subscriber identity (IMSI) to identify the UE with an initial attach message to a server on a network, code for causing the UE to receive, from the server, an authentication request that includes a next PMSI, the next PMSI being a different value derived from the PMSI, and code for causing the UE to send an acknowledgment of receipt of the next PMSI to the server.

In an additional aspect of the disclosure, a method for setting up network access with a server on a network includes receiving, from a user equipment (UE) via one or more network elements in an intervening serving network, a privacy mobile subscriber identity (PMSI) in place of an international mobile subscriber identity (IMSI) to identify the UE from an initial attach message, determining, by the server, a next PMSI based on the PMSI, transmitting, from the server, an authentication request that includes the next PMSI, and receiving, from the UE, an acknowledgement of receipt that includes confirmation of the next PMSI.

In an additional aspect of the disclosure, a server includes a database configured to store a plurality of privacy mobile subscriber identities (PMSI) of user equipment (UE), a transceiver configured to receive, via one or more network elements in an intervening serving network from a UE, a privacy mobile subscriber identity (PMSI) in place of an international mobile subscriber identity (IMSI) to identify the UE from an initial attach message, and a processor configured to determine a next PMSI for the UE based on the PMSI, wherein the transceiver is further configured to transmit an authentication request that includes the next PMSI and receive an acknowledgement of receipt that includes confirmation of the next PMSI.

In an additional aspect of the disclosure, a computer-readable medium having program code recorded thereon includes code for causing a server to receive, from a user equipment (UE) via one or more network elements in an intervening serving network, a privacy mobile subscriber identity (PMSI) in place of an international mobile subscriber identity (IMSI) to identify the UE from an initial attach message, code for causing the server to determine a next PMSI based on the PMSI, code for causing the server to transmit an authentication request that includes the next PMSI, and code for causing the server to receive, from the UE, an acknowledgement of receipt that includes confirmation of the next PMSI.

DETAILED DESCRIPTION

Figure 1:
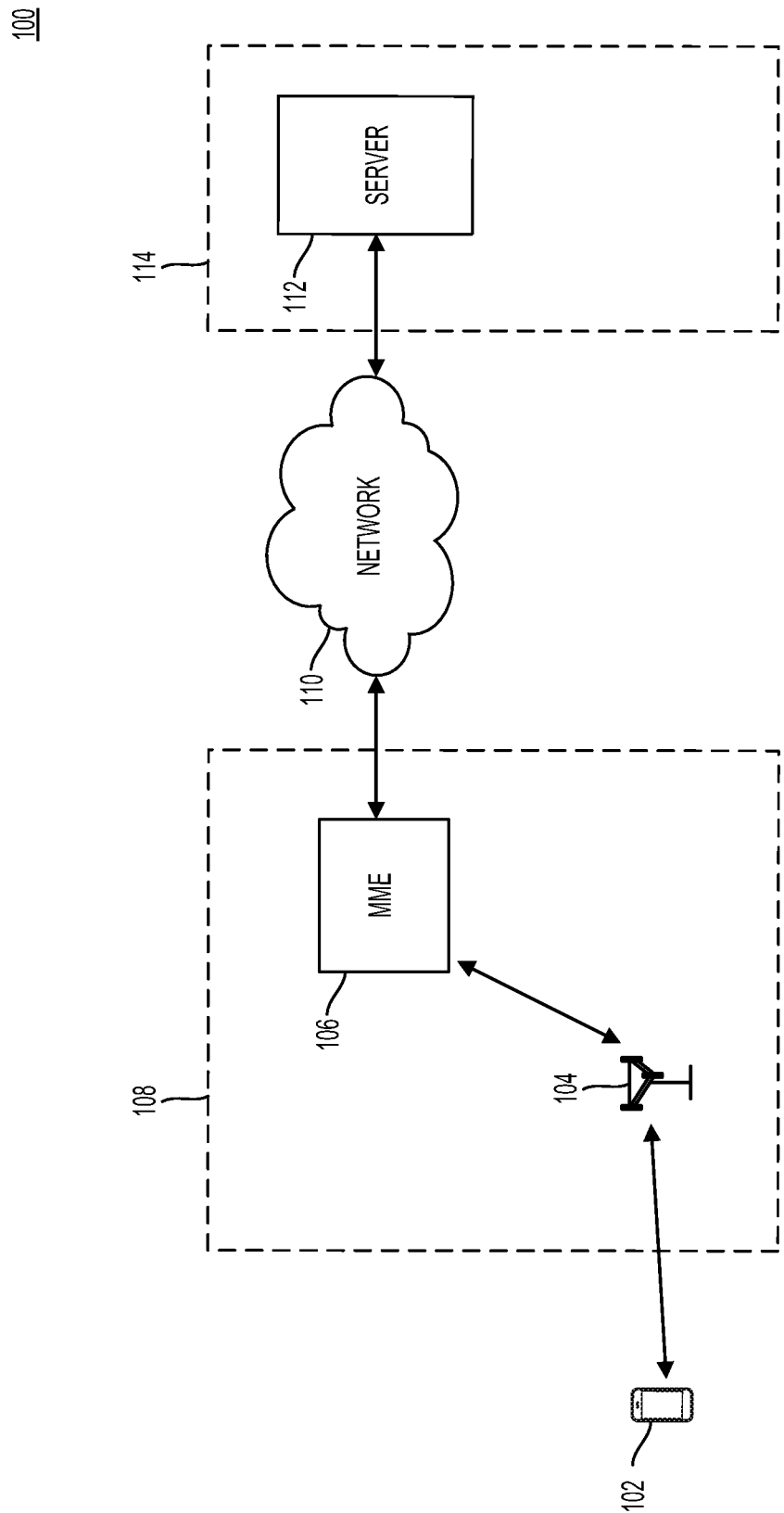
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5$^{th}$ Generation (5G)) network. Embodiments of this disclosure are directed to any type of modulation scheme that may be used on any one or more of the above-recited networks and/or those yet to be developed.

Embodiments of the present disclosure introduce systems and techniques to protect a user equipment's international mobile subscriber identity by providing a privacy mobile subscriber identity (PMSI) instead. In an embodiment, the UE initiates an attach request to a serving network. Instead of providing the IMSI or associated information that some element on the serving network can still use to access to the IMSI, the UE provides with the attach request the PMSI. The PMSI is then used throughout the process, such that the IMSI is not required between the UE and the server. In an embodiment, each PMSI (both for each UE and for different iterations for a specific UE) is unique from the others. This protects the IMSI from eavesdropping and from any potentially malicious elements in the serving network. Continuing with this example, elements of the serving network pass on the PMSI as part of an authentication information request to a server on the UE's home network (e.g., a home subscriber server (HSS)). The HSS locates the PMSI to identify the corresponding UE and provides an authentication information response to the network element. As part of the response, the HSS also derives a next PMSI that the UE will use for a subsequent attach request, checks for PMSI collisions, and provides the next PMSI and a PMSI tracking index to the network elements in the serving network for passing along to the UE.

The next PMSI and PMSI tracking index can be provided in encrypted form. In encrypted form, the next PMSI and PMSI tracking index remain protected from potentially malicious network elements in the serving network and from eavesdropping. The UE receives the encrypted next PMSI and PMSI tracking index and is able to decrypt them. The UE derives its own copy of the next PMSI to confirm that the UE and HSS are synchronized. After confirming that the next PMSI is synchronized between the UE and HSS, the UE sends an acknowledgment token to the server. The UE and the server then each update local copies of the current and next PMSI values. The HSS does not need to store every iteration of the PMSI for the UE. Instead, the HSS can arrive at any iteration of the PMSI based on an initial PMSI value and a desired PMSI tracking index value.

In a further embodiment, the initial PMSI may be agreed upon between the UE and the HSS. In an embodiment, the initial PMSI is agreed upon at subscriber registration, such that the initial PMSI is provisioned to a SIM card of the UE and registered to the HSS. In another embodiment, the UE is not provisioned with the PMSI at subscriber registration but rather initiates over-the-air registration with the HSS. The UE may generate an initial PMSI value and, after encrypting the initial PMSI value using the public key of the HSS (or other shared key between the UE and the HSS), send the proposed initial PMSI to the HSS. The HSS may decrypt the initial PMSI from the UE with a corresponding private key and determine whether the PMSI collides with any other existing PMSI values registered with the HSS. Upon confirming there are no collisions, the HSS may acknowledge the initial PMSI to the UE and store it for use when the UE later initiates its first attach request.

FIG. 1 illustrates a wireless communication network 100 in accordance with various aspects of the present disclosure. The wireless communication network 100 may include a number of UEs 102, as well as a number of base stations 104. A single UE 102 and single base station 104 have been illustrated in FIG. 1 for simplicity of illustration and explanation only. The base station 104 may include an evolved Node B (eNodeB). A base station may also be referred to as a base transceiver station or an access point.

The base station 104 communicates with the UE 102 as shown. A UE 102 may communicate with the base station 104 via an uplink and a downlink. The downlink (or forward link) refers to the communication link from the base station 104 to the UE 102. The uplink (or reverse link) refers to the communication link from the UE 102 to the base station 104.

UEs 102 may be dispersed throughout the wireless network 100, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The wireless communication network 100 is one example of a network to which various aspects of the disclosure apply.

Also illustrated in FIG. 1 is a mobility management entity (MME) 106. The MME 106 may be in charge of control plane functions related to subscribers (e.g., UE 102) and session management. For example, the MME 106 may provide mobility session management as well as support for handovers to other networks, roaming, and subscriber authentication. The MME 106 may assist in selection of an S-GW during an initial attach of the UE 102, non-access stratum (NAS) signaling, NAS signaling security, P-GW selection, bearer management functions including dedicated bearer establishment, lawful interception of signaling traffic, and other functions to name just a few examples. The MME 106 and the base station 104 may be in the same serving network 108 (e.g., part of an evolved packet core (EPC)). As will be recognized, the serving network 108 includes many other network elements that are not shown in FIG. 1 for simplicity of discussion of aspects of the present disclosure.

The MME 106 communicates with a server 112 in a home network 114. In an embodiment, the server 112 is a home subscriber server (HSS), which among other things maintains the home location register (HLR) that is in charge of storing and updating one or more databases that maintain user subscription information. Among other things, the server 112 in the home network 114 has a copy of the IMSI (user identification/addressing) for the UE 102. The server 112 may also maintain user profile information that identifies service subscription states and/or quality-of-service (QoS) information (e.g., maximum allowed bit rate, allowed traffic class, etc.). The server 112 may also include authentication functions, such as managing security information generation from user identity keys and provision of the security information to the HLR (and other network entities). With the security information, network-UE authentication may be performed. One server 112 is illustrated in FIG. 1 for purposes of simplicity of illustration and explanation. The home network 114 may include multiple HSS. For example, the number of HSS may depend upon the number of mobile subscribers, equipment capacity, and network organization. The MME 106 may communicate with the server 112 via the network 110, which may be a direct or indirect connection of various types as will be recognized.

As will be described in more detail below with respect to subsequent figures including the protocol diagram illustrating some signaling aspects between a UE, serving network, and home network (and associated server) for supporting identity privacy in wireless networks, the UE 102 may communicate with the serving network 108 and the home network 114 using a privacy mobile subscriber identity (PMSI) to the exclusion of an IMSI. The PMSI may be a unique number that is associated specifically with the UE 102 and that is maintained by both the UE 102 and the server 112. In embodiments of the present disclosure, the PMSI may include an initial PMSI that is agreed upon and kept at both the UE 102 and the server 112. A particular value for the UE 102's PMSI may be used once, such that each subsequent time the UE 102 initiates an attach request a new PMSI value is provided as part of the request. The UE 102 and the server 112 may store only the initial PMSI agreed upon and an index. As a result, any PMSI value may be subsequently derived based on the initial PMSI and a shared knowledge of a specific index value to describe how many derivation iterations should be performed to arrive at a specific PMSI at both the UE 102 and the server 112 (e.g., such that the UE 102 and the server 112 remain in agreement as to the particular PMSI that is used for a given session).

In an example, the UE 102 may send, as part of its initial attach request to the base station 104, its PMSI instead of IMSI. The base station 104 then forwards the attach request with the UE's PMSI to the MME 106. The MME 106 includes the PMSI in an authentication information request to the server 112 in the home network 114. The server 112 is able to identify the UE 102 based on the PMSI provided in the initial attach request/authentication information request from the MME 106, so that the IMSI does not have to be provided to the serving network 108. Communication back to the UE 102 from the server 112 would also be based on/include the PMSI instead of IMSI as well. Use of PMSI instead of IMSI at all of these stages in the communication path reduces the risk of over-the-air eavesdropping between the UE 102 and the base station 104 and eliminates the availability of the UE 102's IMSI from any network elements in the serving network 108, since the PMSI would be stored instead of the IMSI.

Figure 2:
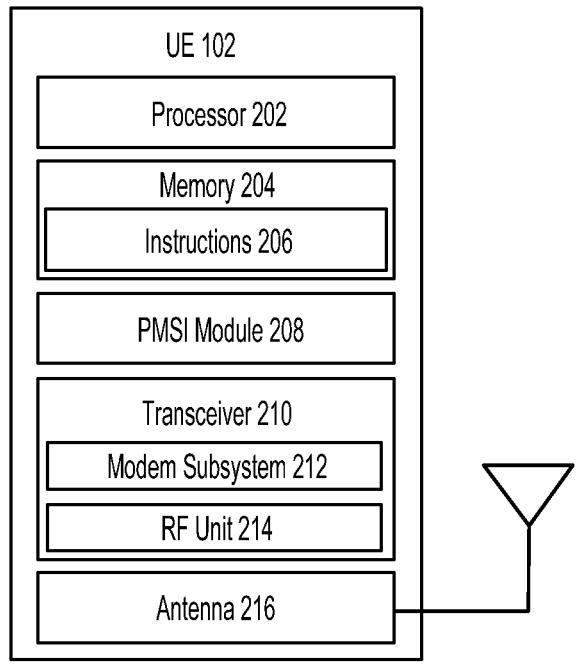
FIG. 2 is a block diagram of an exemplary UE according to embodiments of the present disclosure.

FIG. 2 is a block diagram of an exemplary UE 102 according to embodiments of the present disclosure. The UE 102 may have any one of many configurations described above. The UE 102 may include a processor 202, a memory 204, a PMSI module 208, a transceiver 210, and an antenna 216. These elements may be in direct or indirect communication with each other, for example via one or more buses.

The processor 202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the UE 102 introduced above with respect to FIG. 1 and discussed in more detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UE 102 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PMSI module 208 may be used for various aspects of the present disclosure. For example, the PMSI module 208 may be involved in the initial provisioning of the PMSI for the specific UE 102. In an embodiment, the PMSI is provisioned to the UE 102 at the same time as the IMSI for the UE 102. For example, in some instances the PMSI is provisioned along with the IMSI during subscriber registration with an HSS, such as the server 112 in FIG. 1. This provisioning may occur in a SIM card on the UE 102 at the time of manufacture. In another embodiment, the IMSI may be provisioned before the PMSI is agreed upon between the UE 102 and the server 112. For example, the UE 102 and the server 112 may agree upon a first (initial) PMSI over-the-air after the IMSI has already been provisioned for the UE 102. When the PMSI is agreed upon over-the-air, the UE 102 may generate a proposed initial PMSI (as will be discussed in more detail with respect to FIG. 7A below) and encrypt the proposed initial PMSI with a public key provided by the server 112. In this way, the proposed initial PMSI transmitted by the UE 102 may be protected from eavesdropping and potentially compromised network elements in the serving network 108. The server 112 maintains a corresponding private key and is able to decrypt the proposed initial PMSI. The server 112 may check the proposed initial PMSI against one or more databases to verify that there are no collisions with any other UE's PMSI maintained by the server 112 or otherwise within the home network 114.

The PMSI module 208 may additionally be involved in PMSI acknowledgement. As stated above, a particular PMSI value (based on an initial PMSI) may be used only for a predetermined number of attach requests (e.g., one, two, three, or more) such that different PMSI value is provided for subsequent attach requests. In response to an attach request from the UE 102, the server 112 may generate a "next PMSI"—the next PMSI value to be used in a subsequent session—and share the next PMSI with the UE 102 as part of an authentication request in response to the initial attach request. The UE 102's PMSI module 208 may calculate its own next PMSI value based on the stored initial PMSI and incremented index (as discussed further below) and compare the local calculated next PMSI with the next PMSI received from the server 112. If there is a match, the PMSI module 208 may cause the UE 102 to generate a response acknowledging the next PMSI to the server 112. If there is not a match, then the PMSI module 208 may update its local index with an index received from the server 112 with the next PMSI such that after recomputation the values match.

The transceiver 210 may include a modem subsystem 212 and a radio frequency (RF) unit 214. The transceiver 210 is configured to communicate bi-directionally with other devices, such as base stations 104. The modem subsystem 212 may be configured to modulate and/or encode the data from the PMSI module 208 according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station 104. Although shown as integrated together in transceiver 210, the modem subsystem 212 and the RF unit 214 may be separate devices that are coupled together at the UE 102 to enable the UE 102 to communicate with other devices.

The RF unit 214 may provide the modulated and/or processed data, e.g. data packets (or, more generally, data messages which may contain one or more data packets and other information, including PMSI values), to the antenna 216 for transmission to one or more other devices. This may include, for example, transmission of data messages to the base station 104 according to embodiments of the present disclosure. The antenna 216 may further receive data messages transmitted from the base station 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
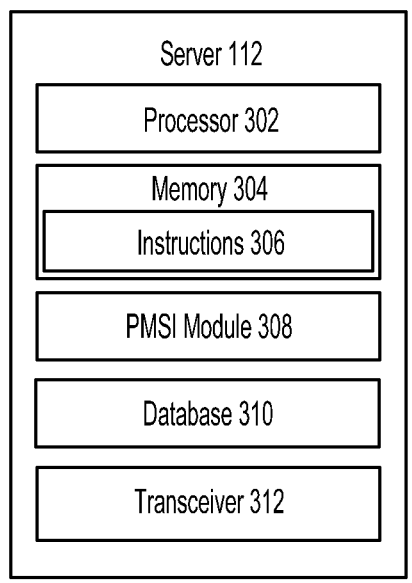
FIG. 3 is a block diagram of an exemplary server according to embodiments of the present disclosure.

FIG. 3 is a block diagram of an exemplary server 112 according to embodiments of the present disclosure. The server 112 may include a processor 302, a memory 304, a PMSI module 308, a database 310, and a transceiver 312. These elements may be in direct or indirect communication with each other, for example via one or more buses. As mentioned above with respect to FIG. 1, the server 112 may be an HSS that provides home location register and authentication functionality, to name just two examples.

The processor 302 may include a CPU, a DSP, an ASIC, a controller, a FPGA device, another hardware device, a firmware device, or any combination thereof configured to perform the operations described herein with reference to the server 112 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the server 112 in connection with embodiments of the present disclosure. Instructions 306 may also be referred to as code, which may be interpreted broadly to include any type of computer-readable statement(s) as discussed above with respect to FIG. 2.

The PMSI module 308 may be used for various aspects of the present disclosure. For example, the PMSI module 308 may be involved in the initial provisioning of the PMSI for the specific UE 102. In an embodiment, the PMSI is provisioned and stored in the database 310 at the same time as the IMSI for the UE 102, for example during subscriber registration. In another embodiment, the IMSI may be provisioned before the PMSI is agreed upon between the server 112 and the UE 102. For example, the server 112 may agree upon a first (initial) PMSI over-the-air from the UE 102 after the IMSI has already been provisioned for the UE 102. When agreed upon over-the-air, the server 112 may receive a proposed initial PMSI generated by, and received from, the UE 102 (as will be discussed in more detail with respect to FIG. 7B below). The proposed initial PMSI may have been encrypted with a public key provided by the server 112 to the UE 102. As a result, the server 112 may decrypt the proposed initial PMSI using a corresponding private key. In this way, the PMSI may be protected from eavesdropping and potentially compromised network elements in the serving network 108. The server 112 may check the proposed initial PMSI against PMSI values in the database 310 to verify that there are no collisions with any other UE's PMSI maintained by the server 112 or otherwise within the home network 114.

The PMSI module 308 may additionally be involved the initial attach procedure with the UE 102. The server 112 may receive the PMSI provided with the initial attach request from the UE and check the PMSI against the PMSI values stored in the database 310. In response to the attach request from the UE 102, the server 112 may generate a next PMSI and transmit the next PMSI to the UE 102 as part of an authentication request response to the initial attach request. In response to receiving a response acknowledging the next PMSI from the UE 102, the PMSI module 308 updates the PMSI values stored in the database 310. For example, the current PMSI value becomes a previous PMSI value and the next PMSI value becomes the current PMSI value utilized for a subsequent interaction, such as a subsequent attach request from the UE 102.

For purposes of discussion, reference is made herein to four PMSI values: (1) an initial PMSI, which is the initial agreed-upon PMSI value that the UE 102 and the server 112 use to derive subsequent PMSI values; (2) a current PMSI, which is the PMSI value used in the current attach request procedure (e.g., the first time the UE 102 sends an initial attach request the current PMSI may equal the initial PMSI, while in other embodiments the PMSI may be iterated one or more times so that the initial PMSI is kept more secure even during the initial attach request); (3) a prior or previous PMSI, which is the PMSI preceding the current PMSI (e.g., the PMSI used in the previous attach request and/or the PMSI used to arrive at the current PMSI); and (4) a next PMSI, which is the PMSI following the current PMSI (e.g., the PMSI derived by both the UE 102 and the sever 112 for agreement on what the PMSI should be for the next attach procedure that the UE 102 initiates with any given serving network 108).

The database 310 may include one or more databases maintained by the server 112, for example the HLR mentioned above with respect to FIG. 1. The database 310 may track subscriber information such as user identification and addressing (including, for example, the IMSI, PMSI (including initial PMSI, current PMSI, previous PMSI, and/or next PMSI) PMSI tracking index, and mobile telephone number of all or a subset of the subscribers), profile information (e.g. service subscription states), as well as security information associated with each subscriber (e.g., security keys).

The transceiver 312 enables the server 112 to communicate to transmit and receive data from external sources, such as other network elements within the home network 114 or the serving network 108. The transceiver 312 may enable wireless and/or wired communications. The transceiver 312 may include, for example, an Ethernet connection, a WiFi connection, or other types of modem and/or RF subsystems as will be recognized.

Figure 4:
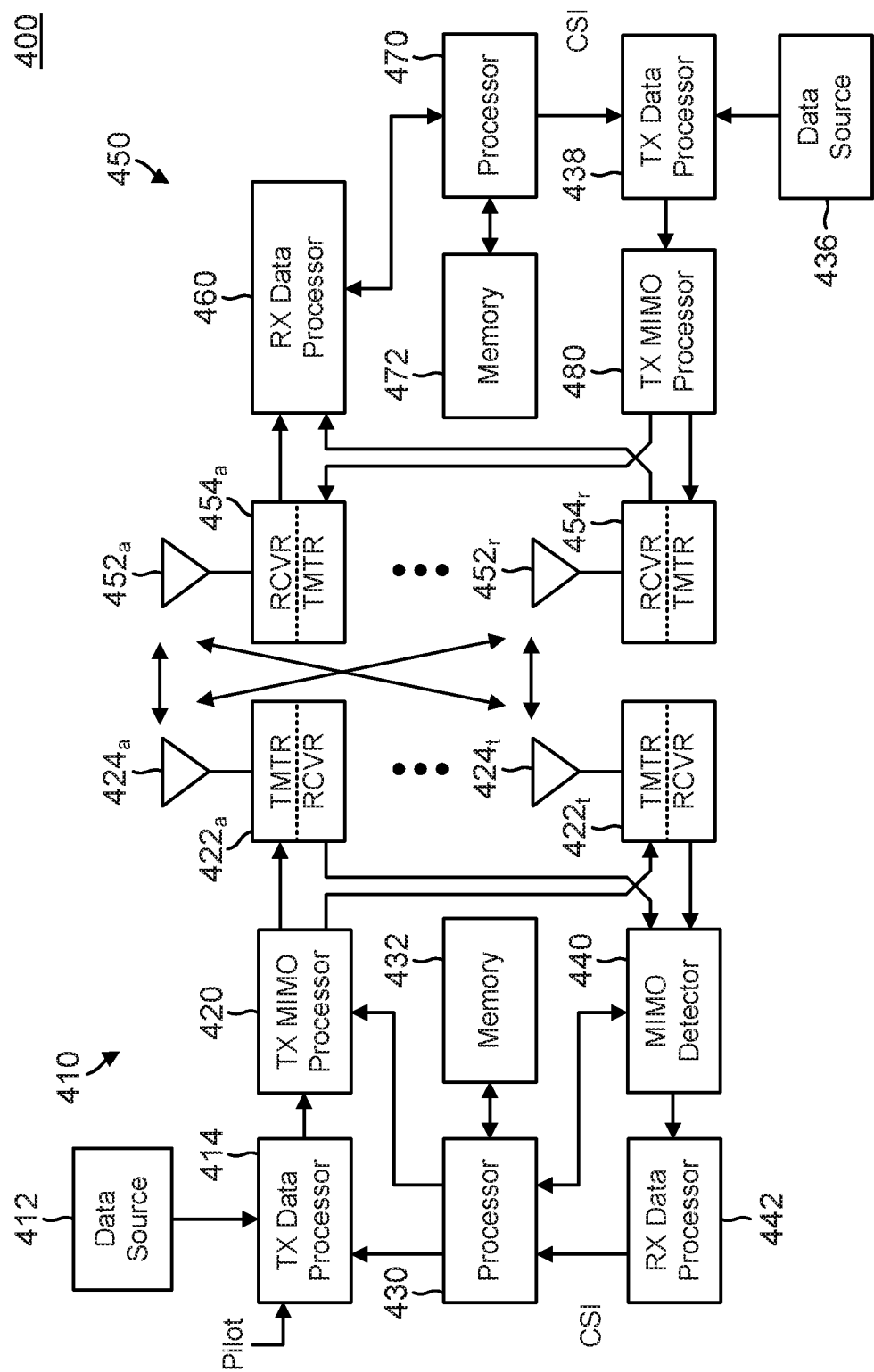
FIG. 4 is a block diagram illustrating an exemplary transmitter system in accordance with various aspects of the present disclosure.

FIG. 4 is a block diagram illustrating an exemplary transmitter system 410 (e.g., a base station 104) and a receiver system 450 (e.g., a UE 102) in a MIMO system 400, according to certain aspects of the present disclosure. At the transmitter system 410, traffic data for a number of data streams is provided from a data source 412 to a transmit (TX) data processor 414. The traffic data may include all manner of traffic, including authentication requests from one or more MME entities according to aspects of the present disclosure.

In a downlink transmission, for example, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data, e.g., a pilot sequence, is typically a known data pattern that is processed in a known manner and may be used at the receiver system to estimate the channel response or other channel parameters. Pilot data may be formatted into pilot symbols. The number of pilot symbols and placement of pilot symbols within an OFDM symbol may be determined by instructions performed by processor 430.

The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430. The number of pilot symbols and placement of the pilot symbols in each frame may also be determined by instructions performed by processor 430, for example as described above with respect to FIG. 2 or 3. The transmitter system 410 further includes a memory 432, for example as described above with respect to FIG. 2 or 3 as well.

The modulation symbols for all data streams are then provided to a TX MIMO processor 420, that may further process the modulation symbols (e.g., for OFDM). TX MIMO processor 420 then provides $N_T$ modulation symbol streams to $N_T$ transmitters (TMTR) $422_a$ through $422_t$. In some embodiments, TX MIMO processor 420 applies beamforming weights to the symbols of the data streams and to the antenna from which the symbol is being transmitted. The transmitter system 410 includes embodiments having only one antenna or having multiple antennas.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters $422a$ through $422t$ are then transmitted from $N_T$ antennas $424_a$ through $424_t$, respectively. The techniques described herein apply also to systems with only one transmit antenna. Transmission using one antenna is simpler than the multi-antenna scenario. For example, there may be no need for TX MIMO processor 420 in a single antenna scenario.

At receiver system 450, the transmitted modulated signals are received by $N_R$ antennas $452_a$ through $452_r$ and the received signal from each antenna 452 is provided to a respective receiver (RCVR) $454_a$ through $454_r$. Each receiver 454 conditions (e.g., filters, amplifies, and downconverts) a respective received signal, digitizes the conditioned signal to provide samples, and further processes the samples to provide a corresponding "received" symbol stream. The techniques described herein also apply to embodiments of receiver system 450 having only one antenna 452.

An RX data processor 460 then receives and processes the $N_R$ received symbol streams from receivers $454_a$ through $454_r$, based on a particular receiver processing technique to provide $N_T$ detected symbol streams. The RX data processor 460 then demodulates, deinterleaves, and decodes as necessary each detected symbol stream to recover the traffic data for the data stream. The recovered traffic may include, for example, information in an authentication information request from an MME according to aspects of the present disclosure. The processing by RX data processor 460 can be complementary to that performed by TX MIMO processor 420 and TX data processor 414 at transmitter system 410.

Information provided by the RX data processor 460 allows the processor 470 to generate reports such as channel state information (CSI) and other information to provide to the TX Data Processor 438. Processor 470 formulates a reverse link message comprising the CSI and/or pilot request to transmit to the transmitter system.

The processor 470 may be implemented for example as described above with respect to the processors described in FIG. 2 or 3. In addition to reverse link messages, the receiver system 450 may transmit other various types of information including attach requests, acknowledgement tokens, and other information for establishing a communication session as well as data during the communication session. The message can be processed by a TX data processor 438, modulated by a TX MIMO processor 480, conditioned by transmitters $454_a$ through $454_r$, and transmitted back to transmitter system 410. As shown, the TX data processor 438 may also receive traffic data for a number of data streams from a data source 436.

At transmitter system 410, the modulated signals from receiver system 450 are received by antennas 424, conditioned by receivers 422, demodulated by a demodulator 440, and processed by a RX data processor 442 to extract the reverse link message transmitted by the receiver system 450. As a result, data may be sent and received between the transmitter system 410 and the receiver system 450. The transmitter system 410 may also be used to transmit information it receives from the receiver system 450 to other network elements within its serving network and receive information from one or more other network elements in the serving network, as will be recognized. The embodiment illustrated in FIG. 4 is exemplary only, and embodiments of the present disclosure are applicable to other transmitter/receiver systems not illustrated in FIG. 4.

Figure 5:
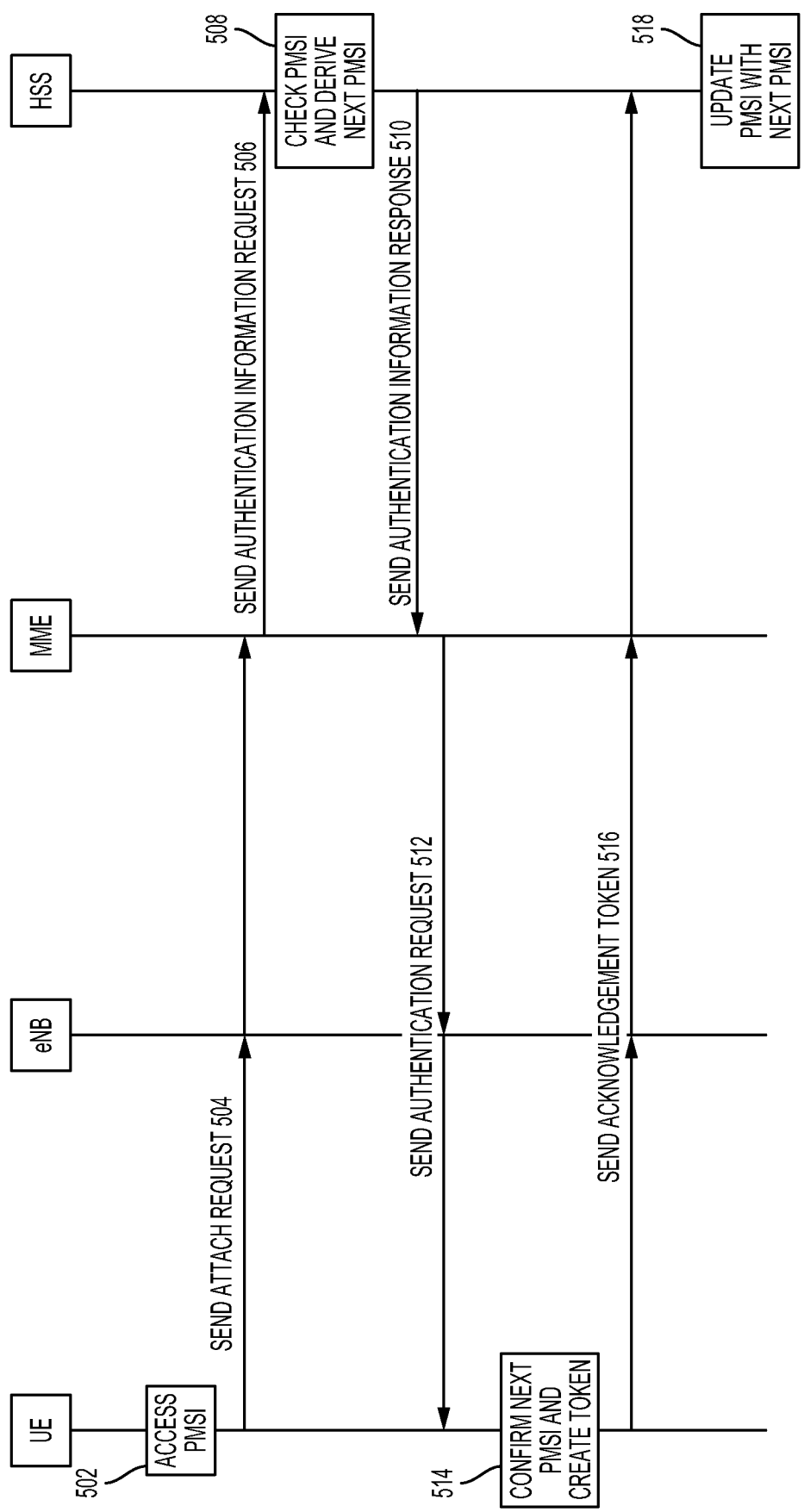
FIG. 5 is a protocol diagram illustrating some signaling aspects between a UE, serving network, and home network for supporting identity privacy in wireless networks in accordance with various aspects of the present disclosure.

FIG. 5 is a protocol diagram illustrating some signaling aspects between a UE, serving network, and home network (and server) for supporting identity privacy in wireless networks in accordance with various aspects of the present disclosure. For simplicity of discussion, reference will be made to the elements shown in FIG. 1 (e.g., UE 102, base station 104 as eNB, MME 106, and server 112 as HSS) in describing the actions in the protocol diagram of FIG. 5. Further for simplicity, discussion will focus on those aspects of the protocol flow that describe aspects of embodiments of the present disclosure instead of all aspects of the attach procedure (e.g., discussion will focus on aspects in addition to, or different from, the 3GPP Standard with some overlap, such as found in TS 23.401 5.3.2.1, or other attach procedures).

In action 502, the UE 102 accesses the current PMSI stored in the UE 102. Where it is the first time that the UE 102 is attempting to attach to the serving network 108, the current PMSI may correspond to the initial PMSI (e.g., where the PMSI is provisioned at the same time as the UE 102's IMSI, or where the PMSI was agreed upon later but before the attach request). In embodiments where prior attach procedures have occurred, or where necessitated by PMSI collisions at the server 112, the current PMSI stored in the UE 102 is the next PMSI that was agreed upon between the UE and the server 112 during the prior attach procedure. The UE 102 may store one or more PMSI values, including initial PMSI, current PMSI, previous PMSI, and/or next PMSI. In some instances, the current PMSI is stored as a value distinct from the prior PMSI value(s).

In some embodiments, the UE 102 derives the current PMSI from a previous PMSI and a PMSI tracking index. For example, the PMSI tracking index may be initialized at zero with the initial PMSI, and each time that the UE 102 and the server 112 successfully complete an attach procedure, the PMSI tracking index may be incremented by a fixed value (e.g., 1) at both the UE 102 and the server 112. Thus, each of the UE 102 and the server 112 may store [initial PMSI, PMSI tracking index] that can be used to arrive at any iteration of the PMSI currently in use. Each may also store [current PMSI, PMSI tracking index] and rely upon the PMSI tracking index to determine whether reference needs to be made to the initial PMSI instead (e.g., where the index values do not match between the UE 102 and the server 112).

In action 504, the UE 102 sends an initial attach request to the serving network 108, for example by transmitting the initial attach request to the base station 104, which then forwards on to the MME 106. The initial attach request includes the current PMSI instead of the IMSI (or any other value that one or more elements within the serving network 108 could use to associate with the IMSI of UE 102).

After the MME 106 receives the initial attach request during action 504, in action 506 the MME 106 takes the information in the initial attach request and sends an authentication information request to the server 112. The authentication information request may include the current PMSI and a sequence number that refers to the serving network 108 being accessed by the UE 102.

At action 508, after the server 112 has received the authentication information request during action 506, the server 112 checks the PMSI included in the authentication information request and (among other things) checks the PMSI against one or more databases. As part of action 508, the server 112 decrypts the PMSI (where PMSI has been encrypted). For example, the server 112 may decrypt the PMSI using a private key associated with a public key utilized to encrypt the PMSI. The server 112 compares the PMSI to the values stored, for example, in the database 310 described in FIG. 3 above. When the server 112 finds a match between PMSI values, the server 112 may also check for the IMSI corresponding to the current PMSI received from the UE 102.

When there is a match of PMSI values, as part of action 508 the server 112 (e.g., the PMSI module 308) cane derive the next PMSI for inclusion in an authentication response to the MME 106. In an embodiment, the next PMSI is derived as follows. The PMSI tracking index is incremented by a fixed amount, 1 for example, and concatenated to the current PMSI value stored in the database 310 (and as identified in the authentication information request from the MME 106). This value is included as an input into another derivation function, together with a $K_{PMSI}$ value. The $K_{PMSI}$ is the PMSI generation key. For example, $K_{PMSI}$ may be created by using a key derivation function (KDF) that has an original key K (e.g., an EPS master key) and a PMSI derivation context CTX as inputs (e.g., $K_{PMSI}$=KDF(K, CTX)). CTX may be a context, e.g. a string such as "PMSI generation"—by using the context in key generation, the same key K may be used to generated different keys, such as by incorporating different contexts to result in differing key generation results.

The $K_{PMSI}$ value and the PMSI concatenated with the index are hashed together in a function (e.g., (result=HMAC ($K_{PMSI}$, PMSI|index), where | is the concatenation operator)). The result of the function may be truncated so that the output of the HMAC function (a keyed-hash message authentication code) is limited to a fixed number of digits (e.g., 9-10 digits). The truncated result may then be concatenated with the mobile network code (MNC) and the mobile country code (MCC) and the resulting value becomes the next PMSI. This value, as a result of the truncation, may be in an embodiment 15 digits long, though it will be recognized that other lengths (both longer and shorter) are possible without departing from the scope of the present disclosure. The overall operation may be described in an embodiment as follows:

$$\text{next } PMSI=MCC|MNC|\text{Truncate}(HMAC(K_{PMSI}, PMSI|\text{index})). \quad \text{(Eq. 1)}$$

Generally speaking, the server 112 may store the PMSI (e.g., initial and/or current PMSI) with the PMSI tracking index. The PMSI tracking index enables the server 112 to compute the current PMSI from the initial PMSI by repeatedly hashing the initial PMSI x number of times, where x equals the PMSI tracking index value. The PMSI tracking index is also useful for accounting as well as for collision avoidance. For example, the server 112 may check the generated next PMSI against other known PMSI values to verify that there are no collisions with any other UE's PMSI. Where there is a collision the server 112 may increment the index (e.g. by 1) and repeat equation (1) with the new PMSI-concatenated-index value.

At action 510, the server 112 takes the information generated and incorporates it into an authentication information response to be sent to the MME 106. The next PMSI may be encrypted for added security in the authentication information response, e.g. so that the MME 106 is not able to discern the next PMSI between the UE 102 and the server 112. For example, the next PMSI may be encrypted with an anonymity key that is derived from $K_{PMSI}$ and a random number (RAND) (e.g., anonymity key=function($K_{PMSI}$, RAND)).

The anonymity key is derived by placing the $K_{PMSI}$ and a random number RAND into a key derivation function as inputs. The key derivation function may be any derivation function that is consistent with the 3GPP standard (or future equivalent/similar standard), for example f5*. In an embodiment, the key derivation function may be an HMAC function. Thus, in an embodiment the anonymity key may be derived by HMAC($K_{PMSI}$, RAND). In an alternative embodiment, the anonymity key may be a key encryption key (KEK) where the initial serving network 108 authentication is enabled.

As part of action 510, the server 112 can send the authentication information response to the MME 106. The authentication information response may include, among other things, an authentication vector and the next PMSI/PMSI tracking index in encrypted form (as encrypted by the anonymity function whose derivation is described above). In an embodiment, the authentication vector may itself include an authentication token, expected response, random number, and local master key $K_{ASME}$. Thus, in addition to what may be traditionally included for the authentication vector, embodiments of the present disclosure also include a next PMSI and PMSI tracking index for synchronization with the UE 102. The MME 106 may store the authentication vector but, in some embodiments, does not store the encrypted PMSI/PMSI tracking index.

At action 512, the MME 106 engages in mutual authentication with the UE 102 by sending an authentication request to the UE 102. The authentication request takes information obtained from the authentication information response of action 510. For example, the MME 106 may keep the expected response as part of the authentication and passes on the authentication token, random number, eUTRAN key set identifier (eKSI), as well as the encrypted next PMSI and PMSI tracking index.

At action 514, the UE 102 (in addition to traditional mutual authentication procedures with the MME 106) confirms the next PMSI and generates an acknowledgement token for return to the server 112. In this regard, the UE 102 decrypts the encrypted next PMSI and PMSI tracking index values from the authentication request received in action 512. The UE 102 is able to decrypt the next PMSI and PMSI tracking index values because the UE 102 has the shared secret key CTX (the PMSI derivation key) that the server 112 (but not the MME 106) also has.

The UE 102 derives the next PMSI on its own in order to compare against the next PMSI generated by the server 112 to confirm they are in sync. The UE 102 may derive the next PMSI by hashing the current PMSI with the next PMSI tracking index. Alternatively, the UE 102 may derive the next PMSI by repeatedly hashing the initial PMSI x number of times, where x equals the PMSI tracking index value (either as saved locally with the UE 102 or as decrypted from the server 112). The UE 102 then compares the locally derived next PMSI with the next PMSI received from the server 112. If the values match, then the UE 102 may proceed with generating an acknowledgement token.

If the two next PMSI values do not match (e.g., where the UE 102 used its own version of the PMSI tracking index), then the UE 102 and the server 112 are not in sync. This may occur, for example, in situations where a message from the UE 102 or to the UE 102 was dropped while in transit. In this scenario, the UE 102 may update its PMSI tracking index to correspond to the PMSI tracking index received and decrypted from the server 112. The UE 102 may then re-derive the next PMSI and compare again to the next PMSI received and decrypted from the server 112.

With the next PMSI confirmed, which will be used as the current PMSI value for a subsequent attach procedure, the UE 102 may proceed with generating the acknowledgment token. The acknowledgment token may be generated by concatenating an encrypted sequence number (used for synchronization) and a MAC-A value. The encryption aspect involves encrypting a sequence number that is shared between the UE 102 and the server 112. The encryption may be performed by another anonymity key that, in an embodiment, is different from the anonymity key described above at action 510 (e.g., the anonymity key here is derived using a different function that is consistent with 3GPP standard or other standard). For example, the anonymity key used to encrypt the sequence number may, itself, be generated by any of a variety of key derivation functions that take, as inputs, the $K_{PMSI}$ described above and a random number.

The MAC-A value concatenated to the encrypted sequence number is generated from a message authentication function (e.g., f1*) that takes as inputs another anonymity key (e.g., different from any of the other anonymity keys described above), the sequence number concatenated with a random number and an Authentication Management Field (AMF) value. The anonymity key used as an input in the message authentication function may be generated by another key derivation function that takes as inputs the $K_{PMSI}$ and a random number. These functions and specific inputs are described for simplicity of discussion. As will be recognized, other functions and inputs to those functions may be used without departing from the scope of the present disclosure.

At action 516, the UE 102 sends the acknowledgment token generated at action 514 back to the MME 106 and the server 112 as a PMSI acknowledgment message. The PMSI acknowledgment message may include the authentication token generated and described above with respect to action 514, as well as a random number (e.g., the same random number used in the key derivation function(s) above). In an embodiment, the PMSI acknowledgment message may be piggybacked with other aspects of the attach procedure (e.g., the ciphered options response message) from the UE 102 to the MME 106 not described in detail here. At the MME 106, the PMSI acknowledgement message may be piggybacked from the MME 106 to the server 112 with another message (e.g., an update location request) sent to the server 112.

At action 518, upon receipt of the acknowledgment token the server 112 updates the previous PMSI with the current PMSI value and the current PMSI with the next PMSI value (that has been confirmed with the UE 102, and, therefore, is synchronized). This is useful so that the PMSI value used in the attach procedure may still be used between the server 112, the serving network 108, and the UE 102 during the established session, for example during handoff to other MMEs so that the location of UE 102 may be properly updated with the server 112 without disclosing the IMSI of UE 102. The attach procedure may then continue to include other aspects that are traditionally performed, although any use of IMSI is replaced by use of PMSI in accordance with the present disclosure.

After successful authentication of the UE 102, e.g. as described above with respect to FIG. 5, the server 112 may be required by law in some jurisdictions to disclose the IMSI for the UE 102 to a requesting serving network, such as serving network 108 illustrated in FIG. 1. According to aspects of the present disclosure, the server 112 may in these circumstances still supply the PMSI in place of IMSI to protect against the possibility of one or more malicious network elements, such as a malicious MME 106.

Such a request may appear as follows (though not illustrated in FIG. 5). The MME 106 may send an IMSI request of UE 102 to the server 112. According to embodiments of the present disclosure, since the IMSI of UE 102 was not received by the MME 106 during the attach procedure (or handover) but rather a PMSI, the MME 106 includes the received PMSI associated with UE 102 together with a $K_{IMSI}$ encryption key. The $K_{IMSI}$ encryption key may be generated as the result from a function, such as an HMAC function that has $K_{ASME}$ (Access Security Management Entity) and an IMSI retrieval key as inputs. The $K_{ASME}$ is an MME 106 base key that is known to both the MME 106 and the server 112.

In response to the IMSI request, the server 112 provides an IMSI response. In an embodiment, the server 112 sends the PMSI with no other ability for the MME 106 to arrive at the IMSI. This may be possible, for example, because the server 112 still maintains the association between PMSI and IMSI for the UE 102 that is the subject of the IMSI request and therefore, for all intents PMSI provides the requested validation since the server 112 will be able to access the same information using PMSI as using IMSI. In another embodiment, the server 112 responds with the PMSI as well as an encrypted version of the IMSI. For example, the server 112 may take both PMSI and IMSI and encrypt them using $K_{IMSI}$. As a result, the IMSI may be correctly decrypted only by the MME 106 that validly owns the $K_{ASME}$.

Figure 6A:
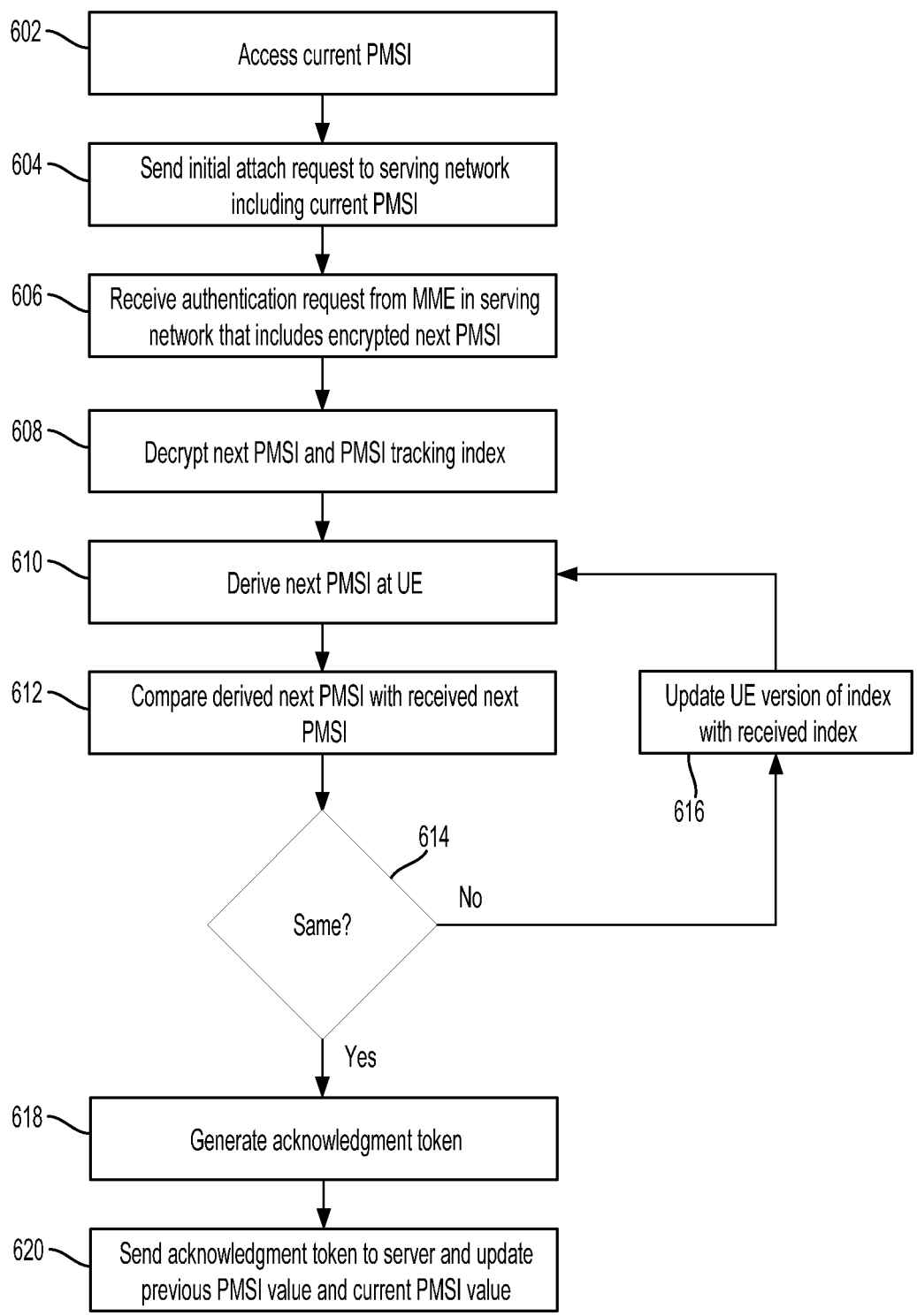
FIG. 6A is a flowchart illustrating an exemplary method for a UE initiating an attach process in accordance with various aspects of the present disclosure.

Turning now to FIG. 6A, a flowchart illustrates an exemplary method 600 for a UE initiating an attach process using a PMSI in accordance with various aspects of the present disclosure. The method 600 may be implemented in UE 102 that is in communication with serving network 108 (e.g., base station 104 and MME 106 to illustrate just two network elements of serving network 108). The method 600 will be described with respect to a specific UE 102 for simplicity of discussion, though it will be recognized that the aspects described herein may be applicable to a plurality of UEs 102. It is understood that additional steps can be provided before, during, and after the steps of method 600, and that some of the steps described can be replaced or eliminated for other embodiments of the method 600.

At step 602, the UE 102 accesses the current PMSI that will be used for the initial attach request at step 604. As discussed above with respect to FIG. 5, the current PMSI may be the initial PMSI stored at the UE 102 (e.g., in memory 204) if it is the first attach attempt for the UE 102. In other embodiments where prior attach procedures have occurred, the current PMSI is the next PMSI confirmed between the server 112 and the UE 102 during the prior attach procedure.

At step 604, once the current PMSI is retrieved the UE 102 sends an initial attach request to the current serving network (e.g., 108 as illustrated in FIG. 1). The initial attach request includes the retrieved current PMSI, instead of the IMSI or other value that could be used to reconstruct the IMSI of UE 102, as well as other information. The initial attach request may be received by the base station 104, which forwards the request on to MME 106. After the MME 106 receives the initial attach request, the MME 106 takes the information in the initial attach request and sends an authentication information request, with the PMSI instead of IMSI, to the server 112.

At step 606, the UE 102 receives an authentication request from the MME 106 (e.g., via the base station 104) in the serving network 108 (for example as described above at action 512 of FIG. 5). The authentication request can include an encrypted next PMSI and PMSI tracking index from the server 112, which the MME 106 may be unable to access because it does not have the appropriate key to decrypt.

At step 608, the UE 102 decrypts the next PMSI and PMSI tracking index values received as part of the authentication request from the MME 106. The UE 102 is able to decrypt the next PMSI and PMSI tracking index values because the UE 102 has the shared secret key that the server 112 used in generating the anonymity key that was used to encrypt the values, as described above with respect to actions 508 and 514 of FIG. 5.

At step 610, the UE 102 derives the next PMSI value on its own (i.e., without relying upon the next PMSI and PMSI tracking index received at step 608). In an embodiment, the UE 102 derives the next PMSI value based on a previous PMSI value and PMSI tracking index value stored at the UE 102 (e.g., in memory 204). In another embodiment, the UE 102 derives the next PMSI value based on the initial PMSI value stored with the UE 102 and the current value of the PMSI tracking index (e.g., hashing the PMSI value a number of times equal to the current value of the PMSI tracking index).

At step 612, the UE 102 (e.g., the processor 202 in cooperation with the PMSI module 208) compares the locally derived next PMSI value with the received and decrypted next PMSI value.

At decision step 614, if the locally derived next PMSI value and the received and decrypted next PMSI value do not match, then the method 600 proceeds to step 616 where the UE 102 updates its local version of PMSI tracking index to equal the value of the received and decrypted PMSI tracking index from the server 112. The method 600 then proceeds from step 616 back to step 610, where the process continues as described above.

Returning to decision step 614, if the locally derived next PMSI value and the received and decrypted next PMSI value do match, then the method 600 proceeds to step 618.

At step 618, the UE 102 (e.g., the processor 202 in cooperation with the PMSI module 208) generates an acknowledgment token to be sent to the server 112, for example as described above with respect to action 514 of FIG. 5.

At step 620, the UE 102 sends the generated acknowledgement token to the server 112, for example via one or more network elements of the serving network 108. The UE 102 also updates its local PMSI values, for example by updating the previous PMSI to reflect the current PMSI value (the PMSI used in the current attach procedure) and the current PMSI to reflect the synchronized next PMSI value. The UE 102 and the serving network 108 may continue with establishing a communication session as will be recognized.

Figure 6B:
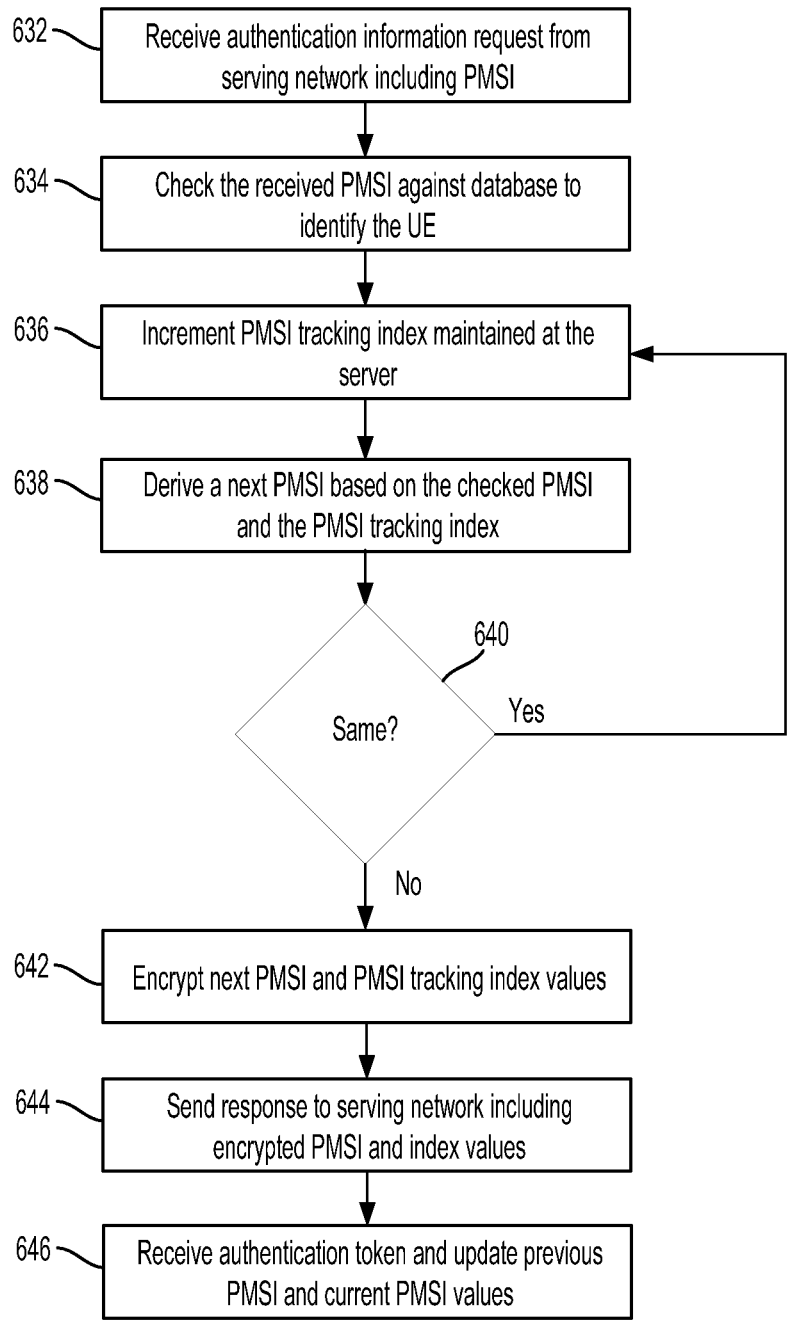
FIG. 6B is a flowchart illustrating an exemplary method for a server acting in an attach process in accordance with various aspects of the present disclosure.

FIG. 6B is a flowchart illustrating an exemplary method 630 for a server in an attach process using a PMSI in accordance with various aspects of the present disclosure. The method 630 may be implemented in server 112 that is in communication with serving network 108 (e.g., MME 106 to illustrate just one network element example of serving network 108). The method 630 will be described with respect to a server 112 for simplicity of discussion, though it will be recognized that the aspects described herein may be applicable to a plurality of servers 112. It is understood that additional steps can be provided before, during, and after the steps of method 630, and that some of the steps described can be replaced or eliminated for other embodiments of the method 630.

At step 632, the server 112 receives an authentication information request from the serving network 108, for example the MME 106, which includes the current PMSI provided to the MME 106 by the UE 102 instead of its IMSI. As described above with respect to action 506, the MME 106 sends the authentication information request based on an initial attach request the MME 106 received from the UE 102.

At step 634, the server 112 (e.g., the processor 302 in cooperation with the PMSI module 308 and database 310) checks the received PMSI against the PMSI values already maintained at the server 112 (or accessible by the server 112 elsewhere) to identify the specific UE 102 that corresponds to the received PMSI, for example as described above with respect to action 508 of FIG. 5.

At step 636, after finding a match the server 112 increments a PMSI tracking index associated with the received PMSI located in the database 310 (or accessible by the server 112 elsewhere). The PMSI tracking index is maintained by the server 112 and kept associated with the UE's PMSI record. The PMSI tracking index enables the server 112 to compute any iteration of the UE 102's PMSI based on the initial PMSI agreed upon between the UE 102 and the server 112, as described above. This ability to arrive at any iteration of the PMSI value also enables the server 112 to accomplish various accounting and charging purposes. The server 112 also uses the PMSI tracking index to address situations where collisions occur between a possible next PMSI value derived by the server 112 and another PMSI value already maintained at the server 112 for another UE 102. In an embodiment, the PMSI tracking index may be incremented by a value of 1 by way of example.

At step 638, the server 112 (for example the processor 302 in cooperation with the PMSI module 308) derives a next PMSI. The server 112 may derive the next PMSI based on the current PMSI received in the authentication information request at step 632 as well as the incremented PMSI tracking index from step 636, for example as described above with respect to action 508 in FIG. 5. Similarly, the server may derive the next PMSI based on the initial PMSI and a PMSI tracking index value.

At decision step 640, the server 112 checks the next PMSI derived at step 638 against other known PMSI values to verify that there are no collisions with any other UE's PMSI. If there is a collision, the method 630 proceeds back to step 636, where the PMSI tracking index is incremented again and then the next PMSI derived at step 638 with the new PMSI tracking index value.

Returning to decision step 640, if there are no collisions then the method 630 proceeds to step 642. At step 642, the server 112 encrypts the next PMSI and incremented PMSI tracking values, for example as described above with respect to action 508 of FIG. 5. As discussed in FIG. 5, the encrypted next PMSI and PMSI tracking index values may be included with an authentication information response together with an authentication vector.

At step 644, the server 112 transmits the authentication information response that includes the encrypted next PMSI and PMSI tracking index values to the MME 106. The MME 106 can then engage in mutual authentication with the UE 102. As part of that mutual authentication, the MME 106 can transmit the encrypted next PMSI and PMSI tracking index values without having decrypted the information at the MME 106.

After the UE 102 confirms the next PMSI value, for example according to one or more of steps 608-616 of FIG. 6A, the method 600 proceeds to step 646. At step 646, once the UE 102 has confirmed the next PMSI value or otherwise has completed synchronization (e.g., by sending a new proposed next PMSI value, requesting a new next PMSI value, or adjusting its local PMSI tracking index to reflect the value of the received and decrypted PMSI tracking index), the server 112 receives an authentication token from the UE 102 via the MME 106. In response, the server 112 then updates its PMSI information (e.g., the server 112 updates the previous PMSI to reflect the current PMSI value (the PMSI used in the current attach procedure) and the current PMSI to reflect the synchronized next PMSI value). The UE 102 and the serving network 108 may continue with establishing a communication session as will be recognized.

Figure 7A:
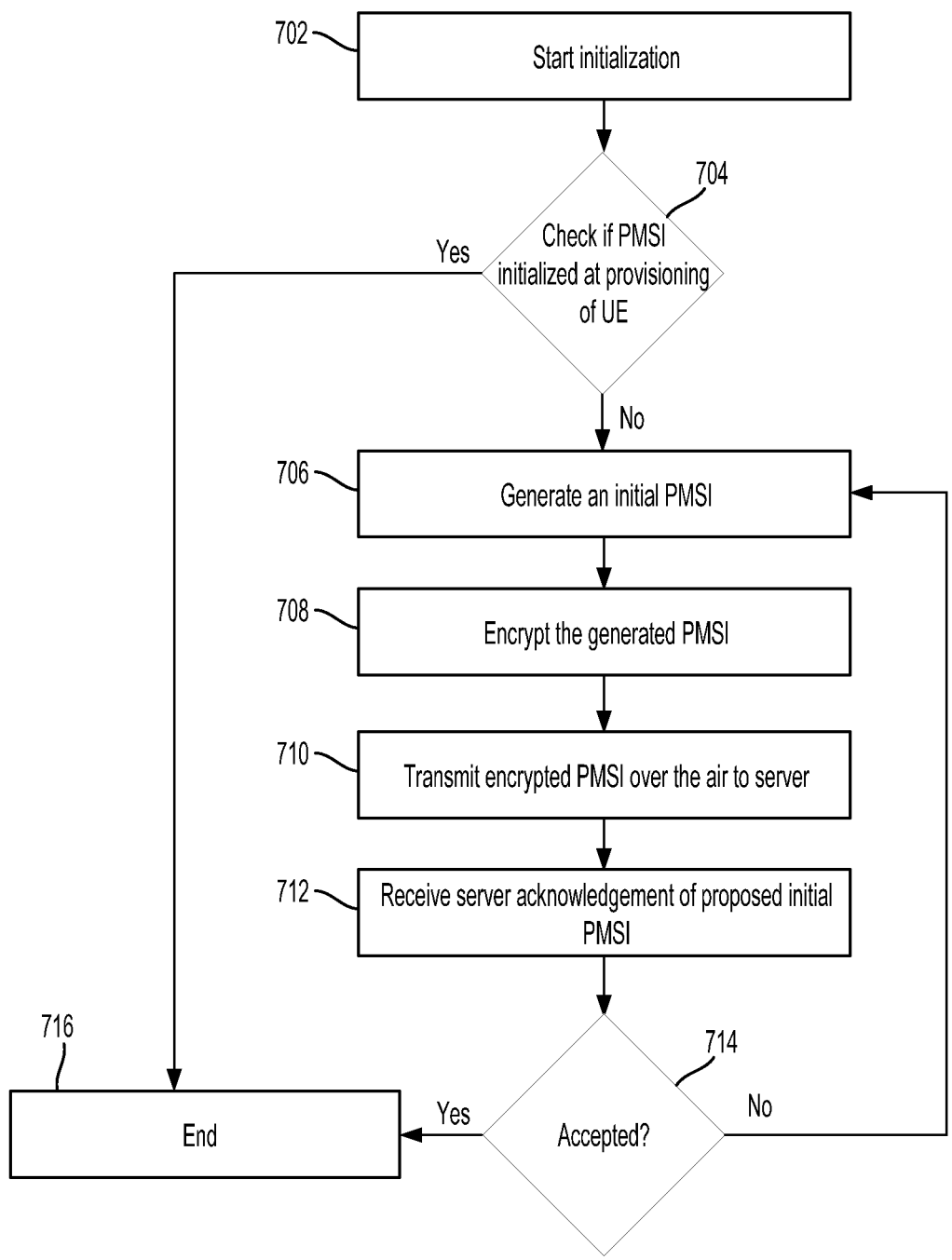
FIG. 7A is a flowchart illustrating an exemplary method for PMSI initialization with respect to a UE in accordance with various aspects of the present disclosure.

Turning now to FIG. 7A, a flowchart illustrates an exemplary method 700 for PMSI initialization with respect to a UE in accordance with various aspects of the present disclosure. The method 700 may be implemented in UE 102 that is in communication with base station 104 and MME 106. The method 700 will be described with respect to a single UE 102 for simplicity of discussion, though it will be recognized that the aspects described herein may be applicable to a plurality of UEs 102. It is understood that additional steps can be provided before, during, and after the steps of method 700, and that some of the steps described can be replaced or eliminated for other embodiments of the method 700.

At step 702, the UE 102 starts the initialization process. This may occur at the time of provisioning of the UE 102 (e.g., programming the SIM card of the UE 102 with IMSI and PMSI values according to aspects of the present disclosure) or at some later time.

At decision step 704, the UE 102 determines whether it already has a PMSI that was initialized at the time of provisioning. This may be done, for example, in cooperation between the processor 202, memory 204, and PMSI module 208. If the PMSI has already been initialized, then the method 700 proceeds to step 716 where the initial PMSI is stored and the PMSI initialization method 700 ends. If the PMSI has not already been initialized, then the method 700 proceeds to step 706.

At step 706, the processor 202 and the PMSI module 208 cooperate together and generate a proposed initial PMSI. The proposed initial PMSI may be based upon any variety of factors. In an embodiment, the proposed initial PMSI may be based upon the UE 102's IMSI, for example based on one or more hashing functions and/or iterations combined with a random or pseudo-random number. In another embodiment, the PMSI is not based upon the IMSI of the UE 102 but rather a random or pseudo-random number, to name just a few examples, so that any eavesdroppers would be unable to derive the IMSI from the PMSI.

At step 708, the processor 202 and the PMSI module 208 cooperate together and encrypt the proposed initial PMSI generated at step 706. In an embodiment, the PMSI is encrypted using a public key that the server 112 shared with the UE 102 at some time previously. The server 112 has a corresponding private key for decrypting the PMSI upon receipt.

At step 710, the UE 102 transmits, via the transceiver 210, the encrypted PMSI to the server 112, for example via the base station 104 and/or the MME 106.

At step 712, the UE 102 receives (via the transceiver 210) a response from the server 112 acknowledging receipt of the proposed initial PMSI.

At decision step 714, the processor 202 and the PMSI module 208 cooperate together and determine whether the response received from the server 112 indicates that the server 112 accepted the proposed initial PMSI. If the response indicates that the server 112 accepted the proposed initial PMSI, then the method 700 proceeds to step 716 where the initial PMSI is stored and method 700 ends. If the response indicates that the server 112 did not accept the proposed initial PMSI, then the method 700 returns to step 706 to generate a new proposed initial PMSI that is different from the one just rejected. The proposed initial PMSI may be rejected, for example, where there is a collision between the PMSI and any other PMSI of another associated UE already stored, e.g. in the database 310 of the server 112.

The method 700 may repeat until a PMSI is arrived that is agreeable to both the UE 102 and the server 112. In an alternative embodiment, if at decision step 714 the UE 102 determines that the server 112 did not accept the proposed initial PMSI, the UE 102 may also look at the response from the server 112 (the same or a different response as at step 712) to identify whether the server 112 sent its own proposed initial PMSI for the UE 102. In this embodiment, the UE 102 may check the proposed initial PMSI from the server 112 to determine if it is acceptable or not to the UE 102. Barring any issues, the UE 102 may accept the proposed initial PMSI from the server 112 and notify the server 112 of the acceptance. Once an initial PMSI is agreed upon, the initial PMSI is stored at the UE 102 for subsequent use and the method 700 ends at step 716.

Figure 7B:
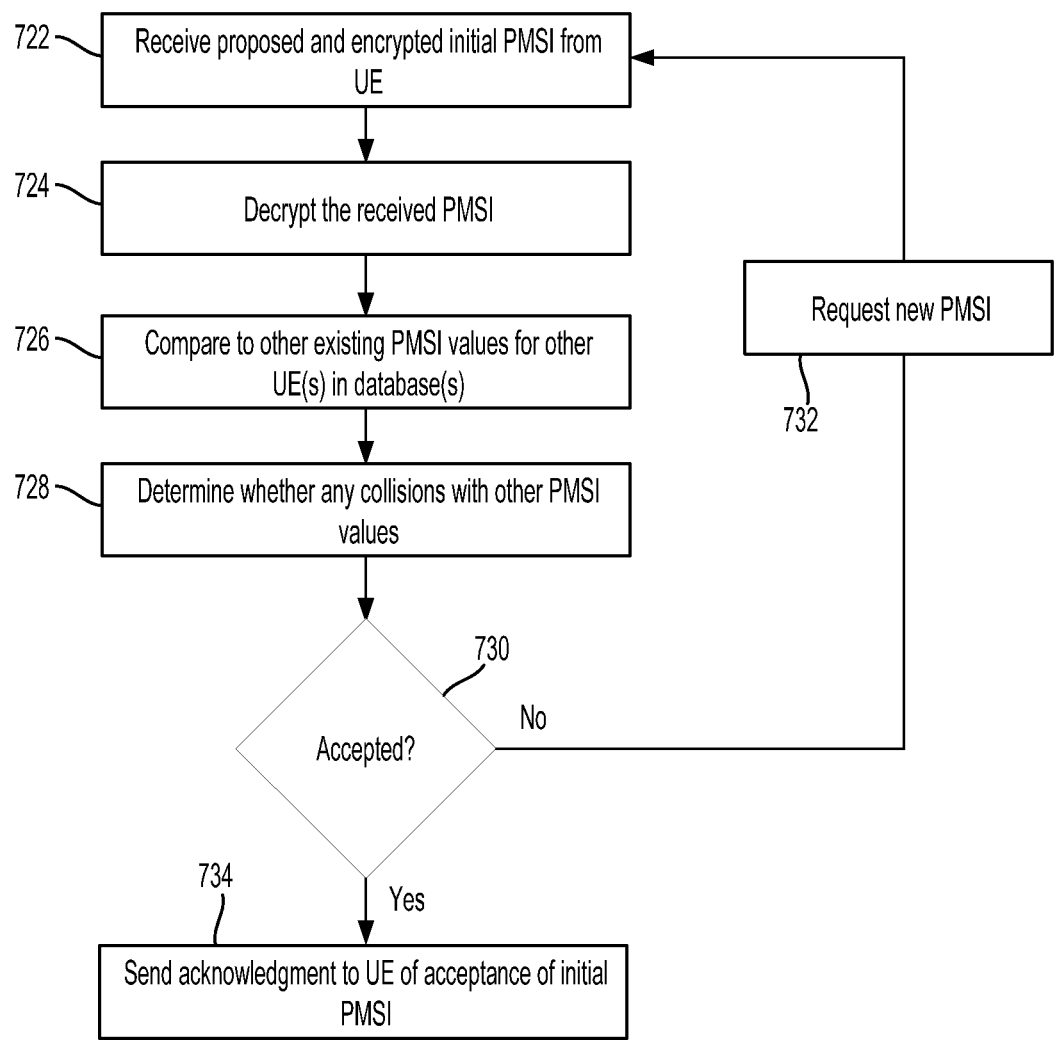
FIG. 7B is a flowchart illustrating an exemplary method for PMSI initialization with respect to a server in accordance with various aspects of the present disclosure.

FIG. 7B is a flowchart illustrating an exemplary method 720 for an attach process using a PMSI with respect to a server in accordance with various aspects of the present disclosure. The method 720 will be described with respect to a single server 112 and single UE 102 for simplicity of discussion, though it will be recognized that the aspects described herein may be applicable to any number of servers 112 and/or UEs 102. It is understood that additional steps can be provided before, during, and after the steps of method 720, and that some of the steps described can be replaced or eliminated for other embodiments of the method 720.

At step 722, the server 112 receives an encrypted, proposed initial PMSI from a UE 102, for example via the transceiver 312.

At step 724, the server 112 decrypts the received PMSI, for example by the processor 302, memory 304, and PMSI module 308 in cooperation. In an embodiment, the received PMSI was encrypted with a public key at the UE 102 that corresponds to a private key kept at or for the server 112.

At step 726, the server 112 compares the received, decrypted PMSI with other PMSI values that already exist for other UEs at the database 310 (or in any other database at the server 112 or elsewhere that maintain information for a plurality of UEs and which are accessible by the server 112).

At step 728, the server 112 determines whether there are any collisions between the received, proposed initial PMSI and any other PMSI values stored or otherwise accessible by the server 112.

At decision step 730, the server 112 decides to accept the proposed initial PMSI or not, based on the determination at step 728. If the server 112 accepts the proposed initial PMSI, the method 720 proceeds to step 734 where the server 112 sends an acknowledgement of acceptance of the initial PMSI to the UE 102, and stores the initial PMSI at the server 112 in the database 310 so that it is associated with the UE 102 (e.g., as part of the record the server 112 keeps for the UE 102).

If at decision step 730 the server 112 determines that it does not accept the proposed initial PMSI, the method 720 proceeds to step 732 where the server 112 requests a new PMSI from the UE 102, which the server 112 transmits to the UE 102 and awaits a response. In an alternative embodiment, the server 112 may instead generate on its own accord a proposed initial PMSI (in response to decision step 730) and transmit that with the denial to the UE 102.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Embodiments of the present disclosure include a user equipment (UE) comprising means for sending a privacy mobile subscriber identity (PMSI) in place of an international mobile subscriber identity (IMSI) to identify the UE with an initial attach message to a serving network; means for receiving, from the serving network, an authentication request that includes a next PMSI determined by a server in communication with the serving network, the next PMSI being derived from the PMSI; and means for sending an acknowledgment of receipt of the next PMSI to the server via the serving network.

The UE further includes means for deriving the PMSI from a previous PMSI, wherein the previous PMSI comprises an initial PMSI. The UE further includes means for deriving the PMSI from a previous PMSI, wherein the previous PMSI comprises a PMSI value derived from an initial PMSI. The UE further includes means for determining, by the UE, the PMSI for network access based on an initial PMSI. The UE further includes means for receiving the initial PMSI during a subscriber registration of the UE with the server. The UE further includes means for provisioning the initial PMSI after a subscriber registration via an over-the-air communication with the server. The UE further includes means for generating a proposed PMSI; means for encrypting the generated PMSI using a server public key, wherein the server maintains a corresponding server private key; and means for receiving acknowledgement from the server to use the generated PMSI as the initial PMSI. The UE further includes means for determining a UE-based next PMSI; and means for comparing the UE-based next PMSI to the next PMSI received as part of the authentication request to determine if there is a match. The UE further includes means for generating an acknowledgement token in response to determining there is a match, the acknowledgement of receipt comprising the acknowledgement token; and means for storing the confirmed next PMSI at the UE for use in a next attach message. The UE further includes means for decrypting the next PMSI in the authentication request using an anonymity key, wherein the anonymity key is derived from a secret key shared between the UE and the server.

Embodiments of the present disclosure further include a server comprising means for receiving, from a user equipment (UE) via one or more network elements in an intervening serving network, a privacy mobile subscriber identity (PMSI) in place of an international mobile subscriber identity (IMSI) to identify the UE from an initial attach message; means for determining, by the server, a next PMSI based on the PMSI; means for transmitting, from the server, authentication information to the serving network that includes the next PMSI, wherein the next PMSI is relayed by the serving network to the UE as part of authentication; and means for receiving, from the UE via the serving network, an acknowledgement of receipt that includes confirmation of the next PMSI.

The server further includes means for deriving the next PMSI from a previous PMSI, wherein the previous PMSI comprises an initial PMSI. The server further includes means for deriving the next PMSI from a previous PMSI, wherein the previous PMSI comprises a PMSI value derived from an initial PMSI. The server further includes means for determining, by the server, the PMSI for network access based on an initial PMSI. The server further includes means for receiving, at the server, the initial PMSI during a subscriber registration of the UE with the server. The server further includes means for receiving, from the UE, a proposed initial PMSI; means for decrypting, by the server, the proposed initial PMSI using a server private key that was encrypted at the UE by a corresponding server public key; and means for transmitting, to the UE, an acknowledgement of the proposed initial PMSI as the initial PMSI. The server further includes means for deriving an anonymity key from a secret key shared between the server and the UE; means for encrypting the next PMSI in the authentication information using the derived anonymity key; means for receiving, as part of the acknowledgment, an acknowledgement token acknowledging the next PMSI; and means for storing the next PMSI in place of the PMSI at the server for use in responding to a subsequent initial attach message from the UE. The server further includes means for detecting a collision between the next PMSI and another existing PMSI associated with a different UE; and means for incrementing a PMSI index and determining a new next PMSI based on the next PMSI and the incremented PMSI index. The server further includes means for receiving, from a mobility management entity (MME) on the serving network separate from a home network that the server is on, a request for the IMSI of the UE; and means for sending, in response to the request, the PMSI of the UE used in the initial attach message instead of the IMSI of the UE. The server further includes means for searching one or more databases for a match to the PMSI included with the initial attach message; and means for sending, in response to not locating a match, a notice for the UE to modify a PMSI index maintained at the UE for generation of an updated PMSI at the UE.

Embodiments of the present disclosure further include a method for network access by a user equipment (UE), comprising determining, by the UE, to attach at a serving network; and sending, from the UE, an initial attach message to the serving network including a temporary identifier (ID) in place of a permanent ID for the UE, wherein a security context with an authentication server (HSS) of the serving network is established based on the temporary ID.

The method further includes receiving, from the HSS of the serving network, an authentication request that includes a next temporary ID determined by the HSS, the next temporary ID being derived from the temporary ID included in the initial attach message. The method further includes sending, from the UE, an acknowledgement of receipt of the next temporary ID to the HSS via the serving network.

Embodiments of the present disclosure further include a user equipment comprising a memory configured to store a temporary identifier (ID); a processor configured to determine to attach at a serving network; and a transceiver configured to send an initial attach message to the serving network including the temporary ID in place of a permanent ID for the UE, wherein a security context with an authentication server (HSS) of the serving network is established based on the temporary ID.

The UE further includes wherein the transceiver is further configured to receive, from the HSS of the serving network, an authentication request that includes a next temporary ID determined by the HSS, the next temporary ID being derived from the temporary ID included in the initial attach message. The UE further includes wherein the processor is further configured to generate an acknowledgement of receipt, and the transceiver is further configured to send the acknowledgment of receipt to the HSS via the serving network.

Embodiments of the present disclosure further include a method for setting up network access with a server on a network, comprising receiving, from a user equipment (UE) via a serving network, an initial attach message including a temporary identifier (ID) in place of a permanent ID for the UE; and establishing a security context based on the temporary ID.

The method further includes determining a next temporary ID based on the temporary ID included in the initial attach message. The method further includes transmitting, from the server, authentication information that includes the next temporary ID to the UE via the serving network as part of authentication. The method further includes receiving, from the UE via the serving network, an acknowledgement of receipt that includes confirmation of the next temporary ID.

Embodiments of the present disclosure further include a server comprising a transceiver configured to receive, from a user equipment (UE) via a serving network, an initial attach message including a temporary identifier (ID) in place of a permanent ID for the UE; and a processor configured to establish a security context based on the temporary ID.

The server further comprises wherein the processor is further configured to determine a next temporary ID based on the temporary ID included in the initial attach message. The server further comprises wherein the transceiver is further configured to transmit authentication information that includes the next temporary ID to the UE via the serving network as part of authentication. The server further comprises wherein the transceiver is further configured to receive, from the UE via the serving network, an acknowledgement of receipt that includes confirmation of the next temporary ID.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method, comprising:
   initiating, by a user equipment (UE), registration of an initial privacy mobile subscriber identity (PMSI) with a serving network via an over-the-air connection;
   generating, by the UE, a proposed PMSI to be a substitute for an international mobile subscriber identity (IMSI);
   transmitting, by the UE to the serving network during the registration and before any initial attach message, the proposed PMSI via the over-the-air connection; and
   using, by the UE, the proposed PMSI as the initial PMSI for the initial attach message in response to receiving an acknowledgment message from the serving network indicating acceptance of the proposed PMSI.

2. The method of claim 1, further comprising:
   re-generating, by the UE, a new proposed PMSI in response to the acknowledgment message indicating rejection of the proposed PMSI; and
   re-transmitting, by the UE, the new proposed PMSI to the serving network via the over-the-air connection.

3. The method of claim 1, further comprising:
   accessing, by the UE from the acknowledgment message, a server-proposed PMSI in place of the proposed PMSI; and
   notifying, by the UE, the serving network of acceptance of the server-proposed PMSI for use as the initial PMSI.

4. The method of claim 1, wherein the generating further comprises:
   generating, by the UE, the proposed PMSI based upon a pseudo-random number.

5. The method of claim 1, wherein the generating further comprises:
   generating, by the UE, the proposed PMSI based upon the IMSI.

6. The method of claim 2, further comprising:
   receiving, by the UE, a public key from the serving network prior to the transmitting; and
   encrypting, by the UE, the proposed PMSI with the public key prior to the transmitting.

7. The method of claim 1, further comprising:
   receiving, by the UE from the serving network in response to the initial attach message, an authentication request including a next PMSI and a tracking index;
   comparing, by the UE, the next PMSI with a UE-derived next PMSI; and
   acknowledging, by the UE, the next PMSI to the serving network for use in a subsequent attach message.

8. The method of claim 1, wherein the generating comprises using a hashing function to generate the proposed PMSI.

9. The method of claim 1, wherein the initiating occurs after the UE is provisioned with the IMSI and before the proposed PMSI is generated by the UE.

10. A user equipment, comprising:
   a processor configured to generate a proposed privacy mobile subscriber identity (PMSI) to be a substitute for an international mobile subscriber identity (IMSI); and
   a transceiver configured to:
   initiate registration of an initial PMSI with a serving network via an over-the-air connection; and
   transmit, to the serving network during the registration and before any initial attach message, the proposed PMSI via the over-the-air connection,
   wherein the processor is further configured to use the proposed PMSI as the initial PMSI for the initial attach message in response to receiving an acknowledgment message from the serving network indicating acceptance of the proposed PMSI.

11. The user equipment of claim 10, wherein:
the processor is further configured to re-generate a new proposed PMSI in response to the acknowledgment message indicating rejection of the proposed PMSI; and
the transceiver is further configured to re-transmit the new proposed PMSI to the serving network via the over-the-air connection.

12. The user equipment of claim 10, wherein:
the processor is further configured to access, from the acknowledgment message, a server-proposed PMSI in place of the proposed PMSI; and
the transceiver is further configured to notify the serving network of acceptance of the server-proposed PMSI for use as the initial PMSI.

13. The user equipment of claim 10, wherein the processor is further configured, as part of the generation, to generate the proposed PMSI based upon a pseudo-random number.

14. The user equipment of claim 10, wherein the processor is further configured, as part of the generation, to generate the proposed PMSI based upon the IMSI.

15. The user equipment of claim 10, wherein:
the transceiver is further configured to receive a public key from the serving network prior to the transmission; and
the processor is further configured to encrypt the proposed PMSI with the public key prior to the transmission.

16. The user equipment of claim 10, wherein:
the transceiver is further configured to receive, from the serving network in response to the initial attach message, an authentication request including a next PMSI and a tracking index;
the processor is further configured to compare the next PMSI with a UE-derived next PMSI; and
the transceiver is further configured to acknowledge the next PMSI to the serving network for use in a subsequent attach message.

17. A non-transitory computer-readable medium having program code recorded thereon, the program code comprising:
code for causing a user equipment (UE) to initiate registration of an initial privacy mobile subscriber identity (PMSI) with a serving network via an over-the-air connection;
code for causing the UE to generate a proposed PMSI to be a substitute for an international mobile subscriber identity (IMSI);
code for causing the UE to transmit, to the serving network during the registration and before any initial attach message, the proposed PMSI via the over-the-air connection; and
code for causing the UE to use the proposed PMSI as the initial PMSI for the initial attach message in response to receiving an acknowledgment message from the serving network indicating acceptance of the proposed PMSI.

18. The non-transitory computer-readable medium of claim 17, further comprising:
code for causing the UE to re-generate a new proposed PMSI in response to the acknowledgment message indicating rejection of the proposed PMSI; and
code for causing the UE to re-transmit the new proposed PMSI to the serving network via the over-the-air connection.

19. The non-transitory computer-readable medium of claim 17, further comprising:
code for causing the UE to access, from the acknowledgment message, a server-proposed PMSI in place of the proposed PMSI; and
code for causing the UE to notify the serving network of acceptance of the server-proposed PMSI for use as the initial PMSI.

20. The non-transitory computer-readable medium of claim 17, wherein the code for causing the generating further comprises:
code for causing the UE to generate the proposed PMSI based upon a pseudo-random number.

21. The non-transitory computer-readable medium of claim 17, further comprising:
code for causing the UE to receive a public key from the serving network prior to the transmission; and
code for causing the UE to encrypt the proposed PMSI with the public key prior to the transmission.

22. The non-transitory computer-readable medium of claim 17, further comprising:
code for causing the UE to receive, from the serving network in response to the initial attach message, an authentication request including a next PMSI and a tracking index;
code for causing the UE to compare the next PMSI with a UE-derived next PMSI; and
code for causing the UE to acknowledge the next PMSI to the serving network for use in a subsequent attach message.

* * * * *